(12) United States Patent
Ando

(10) Patent No.: US 10,720,299 B1
(45) Date of Patent: Jul. 21, 2020

(54) X-RAY GENERATING TUBE, X-RAY GENERATING APPARATUS, AND X-RAY IMAGING APPARATUS

(71) Applicant: Canon Anelva Corporation, Kawasaki-shi, Kanagawa-ken (JP)

(72) Inventor: Yoichi Ando, Inagi (JP)

(73) Assignee: CANON ANELVA CORPORATION, Kanagawa-Ken (JP)

( * ) Notice: Subject to any disclaimer, the term of this patent is extended or adjusted under 35 U.S.C. 154(b) by 0 days.

(21) Appl. No.: 16/449,968

(22) Filed: Jun. 24, 2019

Related U.S. Application Data

(63) Continuation of application No. PCT/JP2018/048607, filed on Dec. 28, 2018.

(51) Int. Cl.
*H01J 35/00* (2006.01)
*H01J 35/16* (2006.01)
*H01J 35/06* (2006.01)
*G01N 23/04* (2018.01)
*H01J 35/32* (2006.01)
*H01J 35/08* (2006.01)

(52) U.S. Cl.
CPC ............. *H01J 35/16* (2013.01); *G01N 23/04* (2013.01); *H01J 35/06* (2013.01); *H01J 35/08* (2013.01); *H01J 35/32* (2013.01)

(58) Field of Classification Search
CPC ................................. H01J 35/08; H01J 35/116
See application file for complete search history.

(56) References Cited

U.S. PATENT DOCUMENTS

| | | | |
|---|---|---|---|
| 5,637,957 A | 6/1997 | Konishi et al. | |
| 9,159,525 B2 | 10/2015 | Yamazaki et al. | |
| 9,401,259 B2 * | 7/2016 | Ukiyo | H01J 35/16 |

(Continued)

FOREIGN PATENT DOCUMENTS

| | | |
|---|---|---|
| JP | 58-106745 | 6/1983 |
| JP | 08-321261 | 12/1996 |

(Continued)

OTHER PUBLICATIONS

Office Action issued in corresponding Japanese Patent Application No. 2019-532145, dated Jul. 12, 2019, with English Translation (11 pages).

(Continued)

*Primary Examiner* — Dani Fox
(74) *Attorney, Agent, or Firm* — Buchanan Ingersoll & Rooney PC

(57) ABSTRACT

An X-ray generating tube includes an insulating tube having a first open end and a second open end, a cathode including an electron emission source and arranged to close the first open end of the insulating tube, an anode including a target that generates an X-ray upon collision with electron from the electron emission source and arranged to close the second open end of the insulating tube, and a tubular electrical conductive member extending from the anode in an inner space of the insulating tube. The insulating tube includes a tubular rib at a position spaced apart from the first open end and spaced apart from the second open end, and the tubular rib is arranged in a radial direction when viewed from an end of the tubular electrical conductive member on a side of the cathode.

19 Claims, 16 Drawing Sheets

(56) References Cited

U.S. PATENT DOCUMENTS

| | | | |
|---|---|---|---|
| 9,653,252 | B2 | 5/2017 | Yanagisawa et al. |
| 9,818,571 | B2 | 11/2017 | Shiozawa et al. |
| 2007/0230663 | A1 | 10/2007 | Anno |
| 2012/0307974 | A1 | 12/2012 | Yamazaki et al. |
| 2014/0369467 | A1 | 12/2014 | Yamazaki et al. |

FOREIGN PATENT DOCUMENTS

| | | |
|---|---|---|
| JP | 2000-164163 | 6/2000 |
| JP | 2012-248505 | 12/2012 |
| JP | 2012-252831 | 12/2012 |
| JP | 2013101879 A | 5/2013 |
| JP | 2014041714 A | 3/2014 |
| JP | 2014086147 A | 5/2014 |
| JP | 2014241230 A | 12/2014 |
| JP | 2015-015227 | 1/2015 |
| JP | 2016103451 A | 6/2016 |
| JP | 2017-054679 | 3/2017 |

OTHER PUBLICATIONS

International Search Report (PCT/ISA/210) and Written Opinion (PCT/ISA/237) with translations dated Jan. 29, 2019, by the Japanese Patent Office as the International Searching Authority for International Application No. PCT/JP2018/048607.

\* cited by examiner

X-RAY GENERATING TUBE, X-RAY GENERATING APPARATUS, AND X-RAY IMAGING APPARATUS

CROSS-REFERENCE TO RELATED APPLICATIONS

This application is a continuation of International Patent Application No. PCT/JP2018/048607 filed on Dec. 28, 2018, the entire disclosures of which is incorporated herein by reference.

TECHNICAL FIELD

The present invention relates to an X-ray generating tube, an X-ray generating apparatus, and an X-ray imaging apparatus.

BACKGROUND ART

PTL 1 discloses an X-ray generating tube including an insulating tube, a cathode, an anode, and an inner anode layer. The insulating tube, the cathode, and the anode constitute an envelope that defines an inner space, and the inner anode layer extends from the anode along the inner surface of the insulating tube. The inner anode layer is electrically connected to the anode and suppresses charge of the insulating tube.

CITATION LIST

Patent Literature

PTL 1: Japanese Patent Laid-Open No. 2016-103451

SUMMARY OF INVENTION

Technical Problem

It is desired to thin the insulating tube in order to lighten the X-ray generating tube. However, the thin insulating tube may weaken the insulating tube or the X-ray generating tube. Further, the thin insulating tube may decrease the withstand voltage of the insulating tube. At the distal end (end on the cathode side) of the inner anode layer where the field strength readily increases, discharge may occur in a direction passing through the insulating tube to cause leakage via a through hole formed by the discharge.

The present invention has as its object to provide a technique advantageous for lightening an X-ray generating tube while suppressing discharge passing through an insulating tube and ensuring the strength of the insulating tube.

Solution to Problem

According to the first aspect of the present invention, there is provided an X-ray generating tube comprising an insulating tube having a first open end and a second open end, a cathode including an electron emission source and arranged to close the first open end of the insulating tube, an anode including a target that generates an X-ray upon collision with an electron from the electron emission source and arranged to close the second open end of the insulating tube, and a tubular electrical conductive member extending from the anode in an inner space of the insulating tube, wherein the insulating tube includes a tubular rib at a position spaced apart from the first open end and spaced apart from the second open end, and the tubular rib is arranged in a radial direction when viewed from an end of the tubular electrical conductive member on a side of the cathode.

According to the second aspect of the present invention, there is provided an X-ray generating tube comprising an insulating tube having a first open end and a second open end, a cathode including an electron emission source and arranged to close the first open end of the insulating tube, an anode including a target that generates an X-ray upon collision with an electron from the electron emission source and arranged to close the second open end of the insulating tube, a tubular electrical conductive member extending from the anode in an inner space of the insulating tube, and a covering member arranged to cover an outside of the insulating tube, having a sheet resistance value smaller than a sheet resistance value of the insulating tube, and configured to receive a potential, wherein the insulating tube includes a tubular rib arranged in a radial direction when viewed from an end of the tubular electrical conductive member on a side of the cathode.

According to the third aspect of the present invention, there is provided an X-ray generating apparatus comprising an X-ray generating tube according to the first or second aspect, and a driving circuit configured to drive the X-ray generating tube.

According to the fourth aspect of the present invention, there are provided an X-ray generating apparatus according to the third aspect, and an X-ray detecting apparatus configured to detect an X-ray having passed through an object after radiated from the X-ray generating apparatus.

Advantageous Effects of Invention

The present invention provides a technique advantageous for lightening an X-ray generating tube while suppressing discharge passing through an insulating tube and ensuring the strength of the insulating tube.

DESCRIPTION OF EMBODIMENTS

Figure 1:
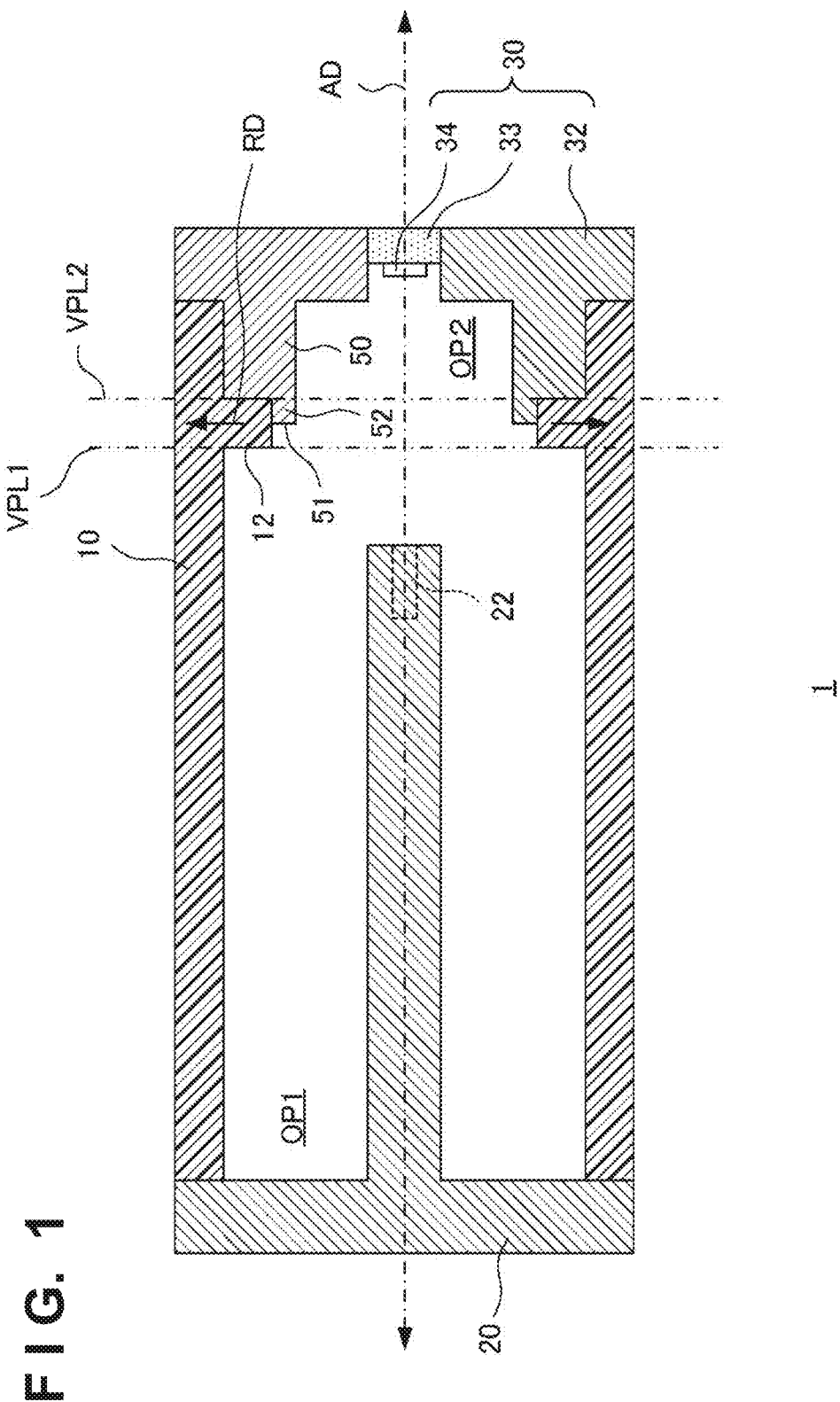
FIG. 1 is a sectional view schematically showing the arrangement of an X-ray generating tube according to the first embodiment of the present invention.

Embodiments of the present invention will be described below in detail with reference to the accompanying drawings. Note that the following embodiments do not limit the claims of the present invention, and not all combinations of features set forth in the embodiments are essential to the present invention. Two or more of features set forth in the embodiments may be combined arbitrarily. The same reference numerals denote the same or similar parts and a repetitive description thereof will be omitted.

FIG. 1 schematically shows the arrangement of an X-ray generating tube 1 according to a first embodiment of the present invention. The X-ray generating tube 1 according to the first embodiment can include an insulating tube 10, a cathode 20, an anode 30, and a tubular electrical conductive member 50. The insulating tube 10 has a first open end OP1 and a second open end OP2. The insulating tube 10 is made of an insulating material (for example, ceramic or glass) and has a tubular shape extending in an axial direction AD. The tubular shape is a shape that forms a closed figure on a section perpendicular to the axial direction AD and is, for example, a cylindrical shape. The concept of the tubular shape can include a shape having different sectional areas at different positions in the axial direction AD.

The cathode 20 is arranged to close the first open end OP1 of the insulating tube 10. The cathode 20 includes an electron emission source 22 configured to emit electrons. The electron emission source 22 can include, for example, a filament, a converging electrode configured to cause electrons emitted from the filament to converge, and the like. For example, a potential of –100 kV with reference to the anode 30 can be applied to the cathode 20.

The anode 30 is arranged to close the second open end OP2 of the insulating tube 10. The anode 30 can include a target 34, a target holding plate 33 that holds the target 34, and an electrode 32 that holds the target holding plate 33. The electrode 32 is electrically connected to the target 34 and applies a potential to the target 34. Electrons from the electron emission source 22 collide with the target 34 and the target 34 generates an X-ray. The generated X-ray passes through the target holding plate 33 and is radiated outside the X-ray generating tube 1. The anode 30 can be maintained at, for example, the ground potential but may be maintained at another potential. The target 34 can be formed from a material of high melting point and high X-ray generation efficiency such as tungsten, tantalum, or molybdenum. The target holding plate 33 can be formed from, for example, a material that transmits an X-ray, such as beryllium or diamond.

The tubular electrical conductive member 50 is arranged to extend from the anode 30 in the inner space of the insulating tube 10. The tubular electrical conductive member 50 has a tubular shape extending in the axial direction AD. The tubular electrical conductive member 50 is electrically connected to the anode 30. The tubular electrical conductive member 50 is spaced apart from the cathode 20. The tubular electrical conductive member 50 can be arranged to surround at least part of the orbit (path between the electron emission source 22 and the target 34) of electrons emitted from the electron emission source 22. The tubular electrical conductive member 50 can function to reduce the influence of charge of the insulating tube 10 on the orbit of electrons emitted from the electron emission source 22. The tubular electrical conductive member 50 can be arranged to, for example, contact the inner side surface of the insulating tube 10, but may be arranged apart from the inner side surface of the insulating tube 10. The tubular electrical conductive member 50 may be constituted integrally with the anode 30, but may be constituted separately from the anode 30 and coupled or fixed to the anode 30. The tubular electrical conductive member 50 can be, for example, a film formed on the inner side surface of the insulating tube 10 by vapor deposition such as CVD (Chemical Vapor Deposition) or PVD (Physical Vapor Deposition), plating, coating, or the like. Alternatively, the tubular electrical conductive member 50 may be inserted into the insulating tube 10 after formed separately from the insulating tube 10.

The insulating tube 10 can include a tubular rib 12 at a position spaced apart from the first open end OP1 and spaced apart from the second open end OP2. The thickness of a portion of the insulating tube 10 where the tubular rib 12 is arranged is larger than that of the remaining portion of the insulating tube 10. The tubular rib 12 increases the strength of the insulating tube 10. Hence, the tubular rib 12 is provided advantageously to decrease the thickness of a portion of the insulating tube 10 except the portion where the tubular rib 12 is arranged. This can contribute to lightening of the X-ray generating tube 1. The tubular rib 12 can be arranged to face the inner space of the insulating tube 10.

The tubular rib 12 can be arranged in a radiation direction RD when viewed from an end 52 of the tubular electrical conductive member 50 on the cathode 20 side. The end 52 of the tubular electrical conductive member 50 is a portion where the field strength readily increases. Thus, to suppress discharge in a direction passing through the insulating tube 10, it is effective to provide the tubular rib 12 in the radiation direction RD of the end 52. That is, the tubular rib 12 is advantageous for achieving both suppression of discharge passing through the insulating tube 10 and ensuring of the strength of the insulating tube 10. For example, the end 52 of the tubular electrical conductive member 50 on the cathode 20 side can be positioned between a first virtual plane VPL1 including an end face of the tubular rib 12 on the cathode 20 side and a second virtual plane VPL2 including an end face of the tubular rib 12 on the anode 30 side. As will be described later, the first virtual plane VPL1 and an end face 51 of the tubular electrical conductive member 50 on the cathode 20 side are preferably spaced apart from each other in terms of improvement of the withstand voltage.

Figure 13:
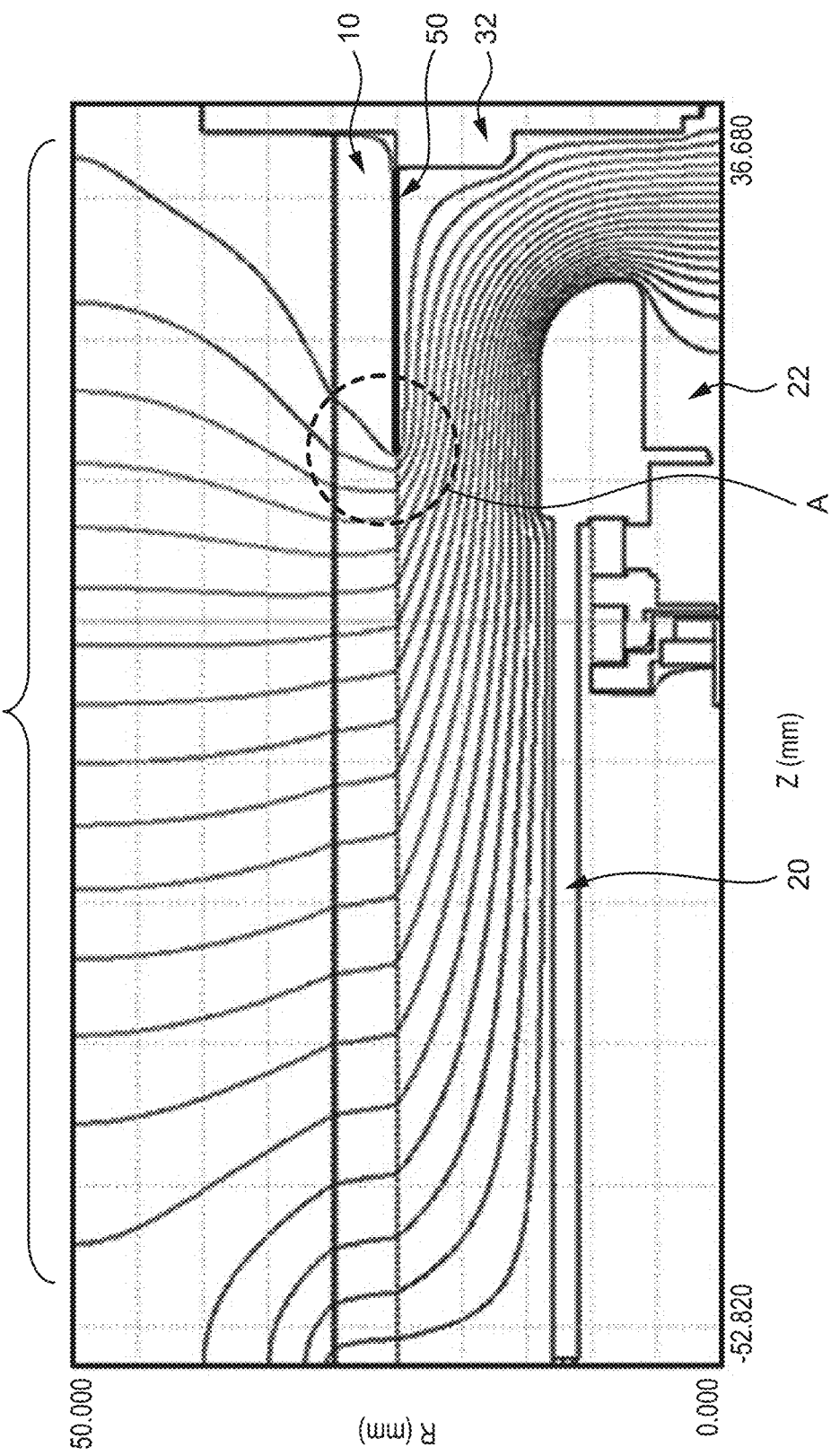
FIG. 13 is a view showing a simulation result representing a potential in the X-ray generating tube.

FIG. 13 shows a simulation result representing a potential in the X-ray generating tube. The field strength is high at a portion where the interval between equipotential lines is small. As indicated by a symbol A, the field strength at the end of the tubular electrical conductive member 50 is high and discharge passing through the insulating tube 10 readily occurs at this portion. To suppress the discharge, it is effective to provide the tubular rib 12 at this portion and thicken the insulating tube 10.

Figure 2:
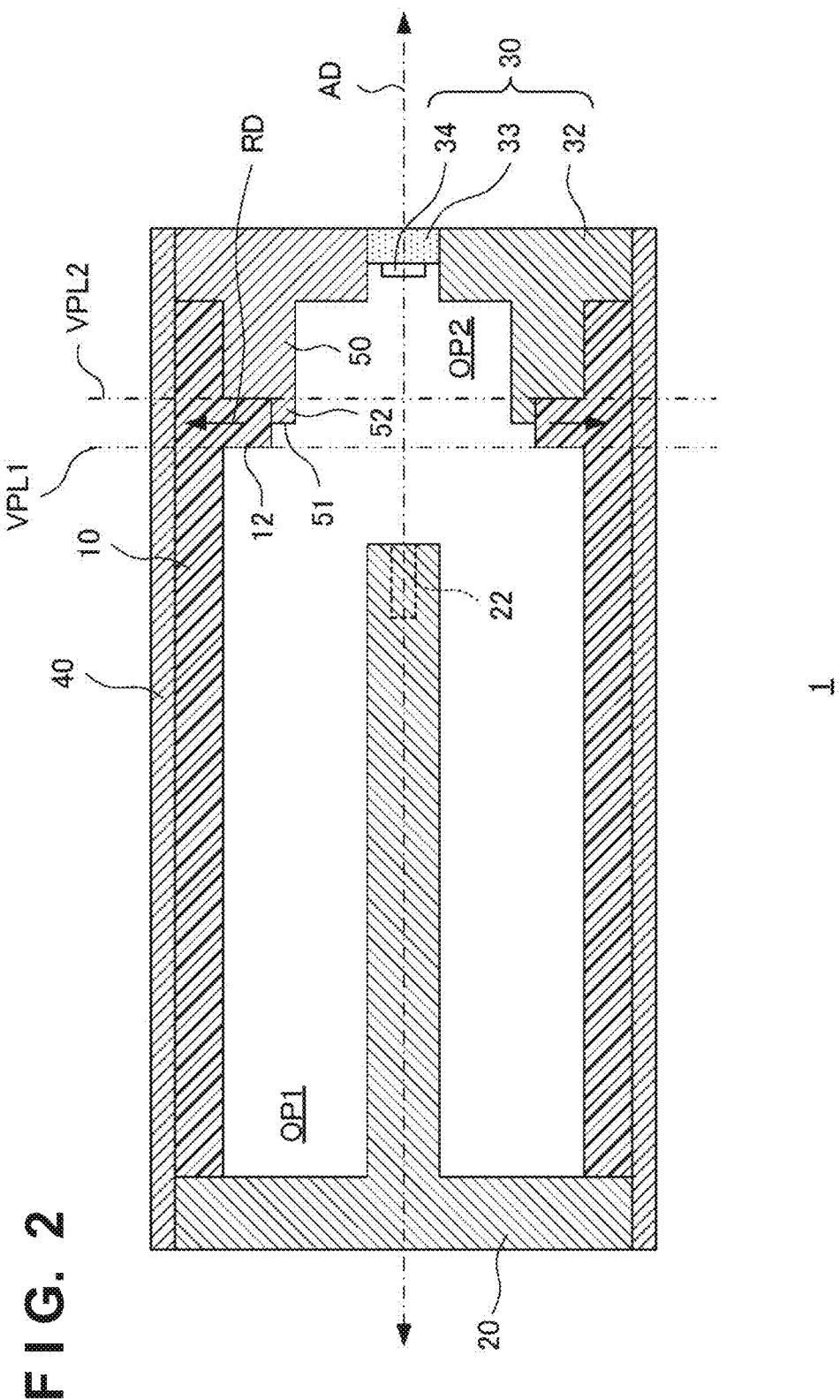
FIG. 2 is a sectional view schematically showing the arrangement of an X-ray generating tube according to the second embodiment of the present invention.

FIG. 2 schematically shows the arrangement of an X-ray generating tube 1 according to a second embodiment of the present invention. Matters not mentioned in the second embodiment can comply with the first embodiment. The X-ray generating tube 1 according to the second embodiment is different from the X-ray generating tube 1 according to the first embodiment in that it includes a covering member 40 which is arranged to cover the outside of an insulating tube 10 and receives a potential. The covering member 40 can be arranged to be electrically connected to a cathode 20 and an anode 30. The covering member 40 can cover the cathode 20, the insulating tube 10, and the anode 30 so as to, for example, contact the cathode 20 and the anode 30. The sheet resistance value of the covering member 40 is smaller than that of the insulating tube 10.

For example, assume that the specific resistance of the insulating tube 10 at 100° C. is equal to or higher than $1\times10$ Ωm and equal to or lower than $1\times10^{15}$ Ωm, the sheet resistance value of the insulating tube 10 at 100° C. is $R_s1$, and the sheet resistance value of the covering member 40 at 100° C. is $R_s2$. In this case, $R_s2/R_s1$ is preferably equal to or higher than $1\times10^{-5}$ and equal to or lower than $1\times10^{-1}$. The covering member 40 can be formed from, for example, a glassy material such as Kovar glass, glaze, or frit glass, or a metal oxide film.

The covering member 40 covers the insulating tube 10 advantageously to, for example, form a smooth surface on the outside of the insulating tube 10 and suppress entrance of dirt between particles constituting the insulating tube 10. This can improve a creepage withstand voltage on the outer surface of the insulating tube 10. The covering member 40 has low conductivity, and even if charge occurs on the outer surface of the insulating tube 10, charges can be moved before generating a large potential difference. Generation of discharge that may damage the insulating tube 10 can be prevented.

Figure 14:
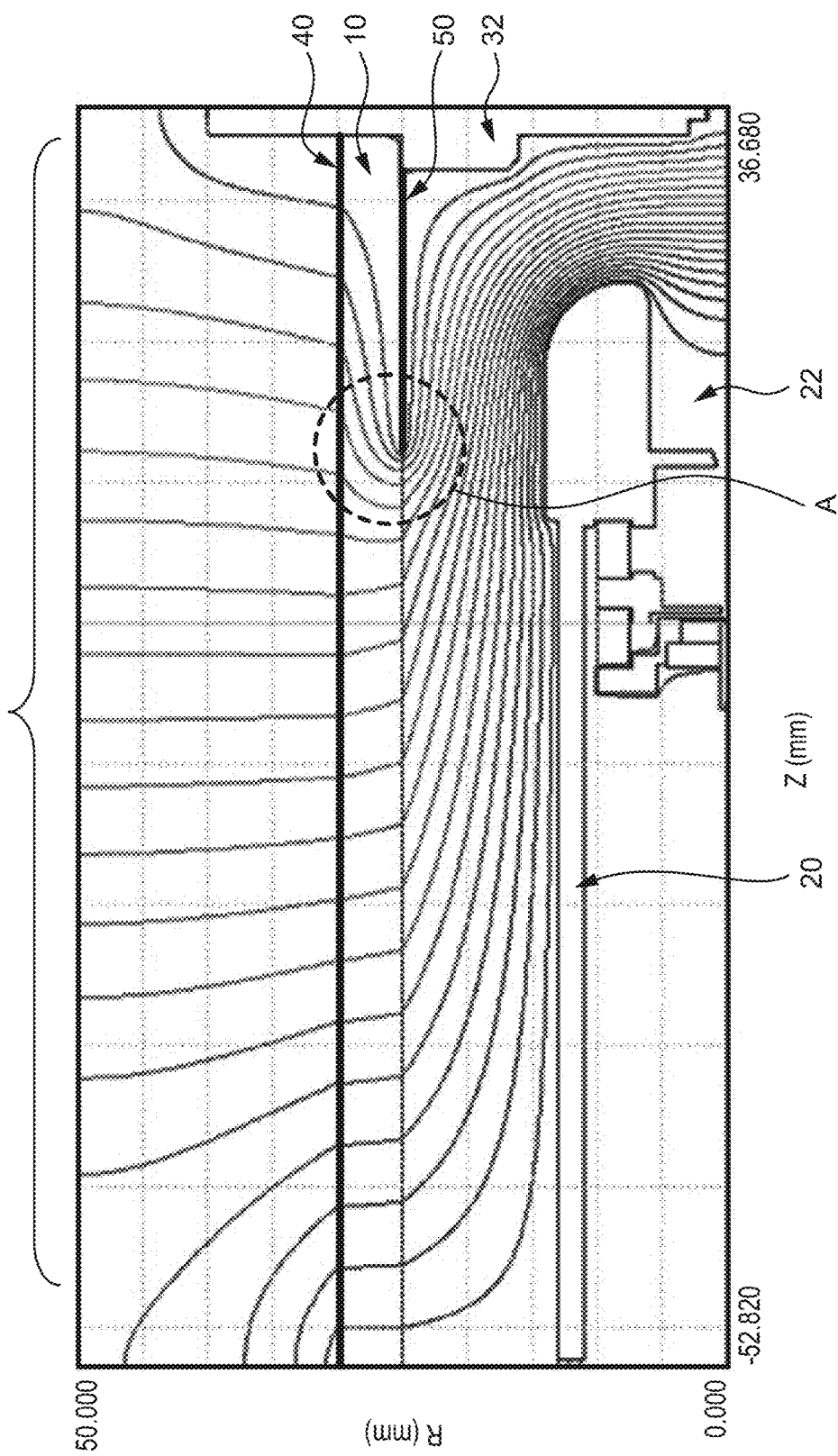
FIG. 14 is a view showing a simulation result representing a potential in the X-ray generating tube.

However, the covering of the insulating tube 10 with the covering member 40 may increase the field strength at the end of a tubular electrical conductive member 50, as shown in FIG. 14. FIG. 14 shows a simulation result representing a potential in the X-ray generating tube in which the insulating tube 10 is covered with the covering member 40. The field strength (interval between equipotential lines) on the surface of the covering member 40 is uniformed by providing the covering member 40. However, this further increases the field strength at the end of the tubular electrical conductive member 50 near the end of the tubular electrical conductive member 50, as indicated by a symbol A.

To suppress discharge in a direction passing through the insulating tube 10, it is highly effective to provide the tubular rib 12 in a radiation direction RD of an end 52 in the arrangement in which the covering member 40 is provided.

Figure 3:
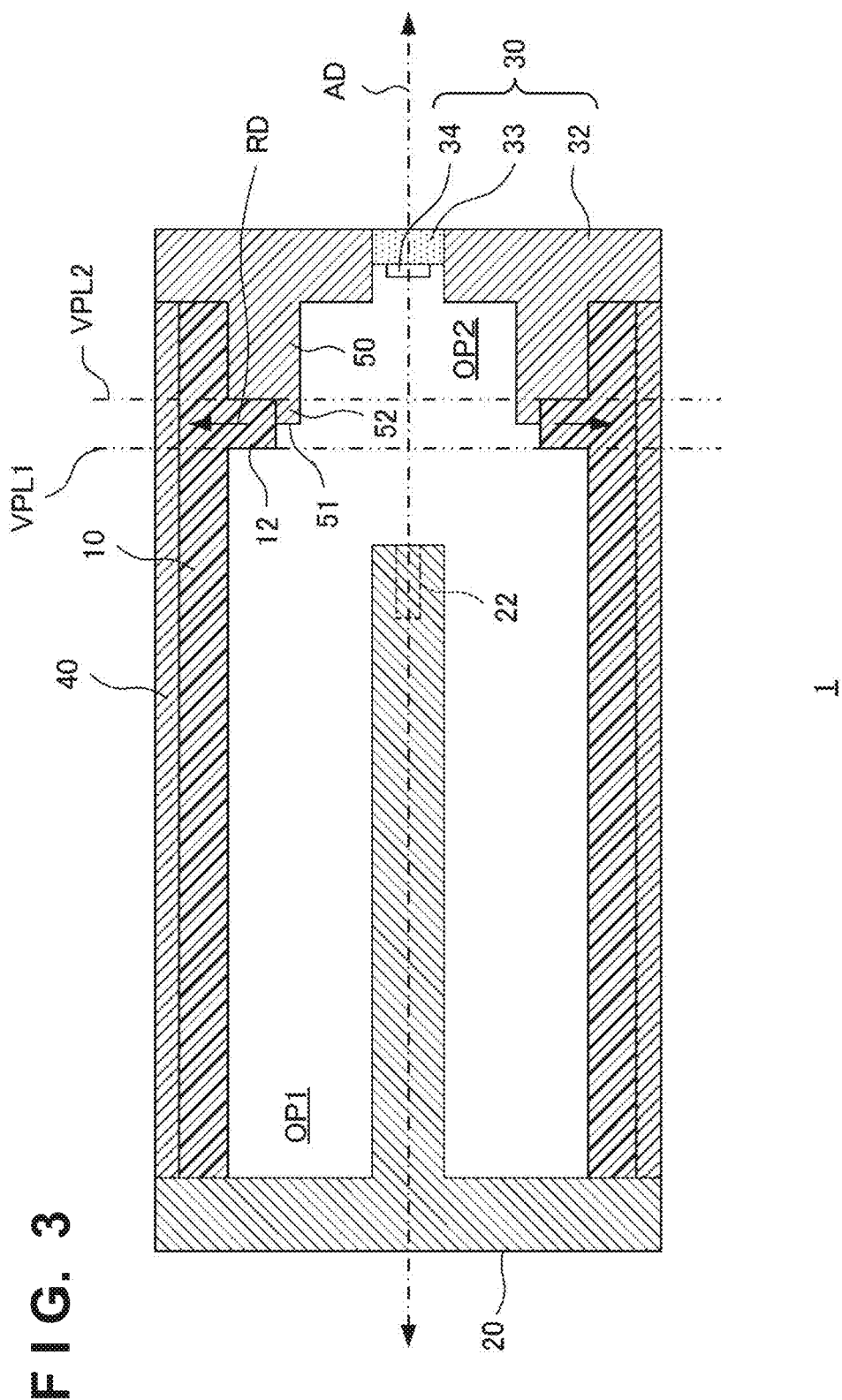
FIG. 3 is a sectional view schematically showing the arrangement of an X-ray generating tube according to the third embodiment of the present invention.

FIG. 3 schematically shows the arrangement of an X-ray generating tube 1 according to a third embodiment of the present invention. Matters not mentioned in the third embodiment can comply with the first or second embodiment. Although a covering member 40 covering an insulating tube 10 is provided in all the following embodiments, the covering member 40 is not an essential constituent in the present invention. In the third embodiment, the covering member 40 is arranged to be electrically connected to a cathode 20 and an anode 30, but is arranged not to cover the side surfaces of the cathode 20 and anode 30.

Figure 4:
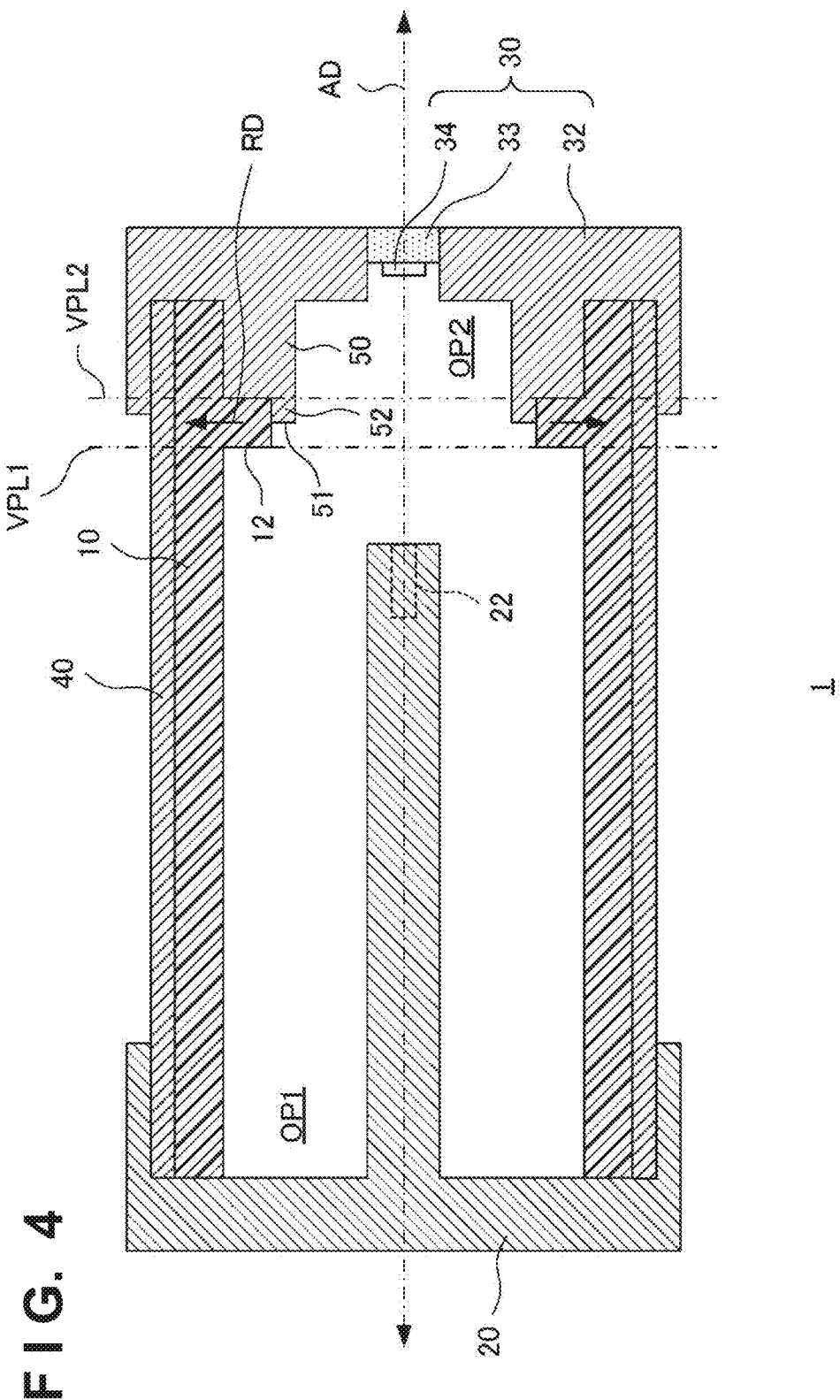
FIG. 4 is a sectional view schematically showing the arrangement of an X-ray generating tube according to the fourth embodiment of the present invention.

FIG. 4 schematically shows the arrangement of an X-ray generating tube 1 according to a fourth embodiment of the present invention. Matters not mentioned in the fourth embodiment can comply with the first or second embodiment. In the fourth embodiment, a covering member 40 is arranged to be electrically connected to a cathode 20 and an anode 30, but is arranged not to cover the side surfaces of the cathode 20 and anode 30. The cathode 20 has a portion covering part of the side surface of the covering member 40, and/or the anode 30 has a portion covering part of the side surface of the covering member 40.

Figure 5:
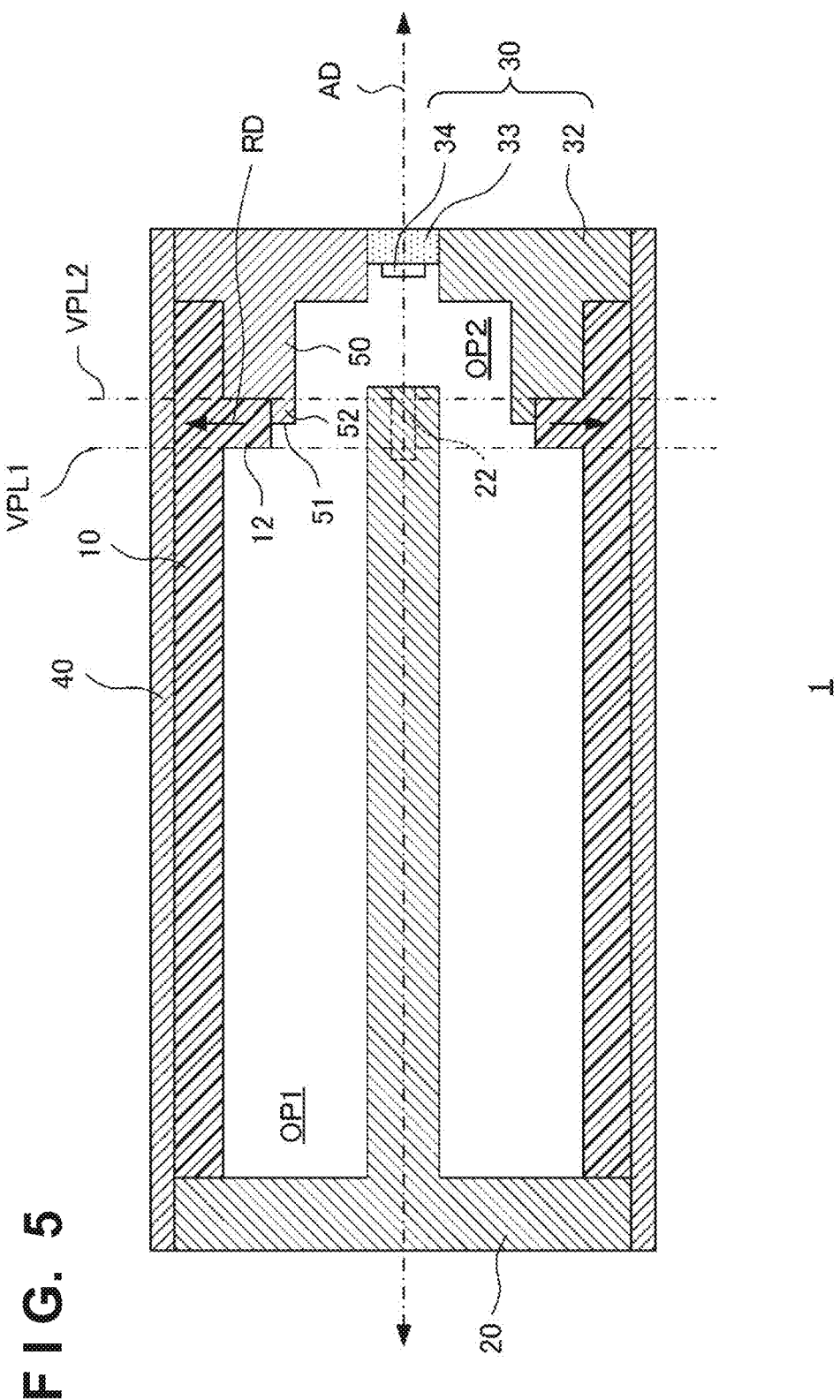
FIG. 5 is a sectional view schematically showing the arrangement of an X-ray generating tube according to the fifth embodiment of the present invention.

FIG. 5 schematically shows the arrangement of an X-ray generating tube 1 according to a fifth embodiment of the present invention. Matters not mentioned in the fifth embodiment can comply with the first to fourth embodiments. In the fifth embodiment, a tubular electrical conductive member 50 is arranged to surround an end of an electron emission source 22 on an anode 30 side. FIG. 5 shows an example in which the arrangement in which the tubular electrical conductive member 50 is arranged to surround the end of the electron emission source 22 on the anode 30 side is applied to the X-ray generating tube 1 according to the second embodiment. This arrangement is applicable to even the X-ray generating tubes 1 according to the first, third, and fourth embodiments.

Figure 6:
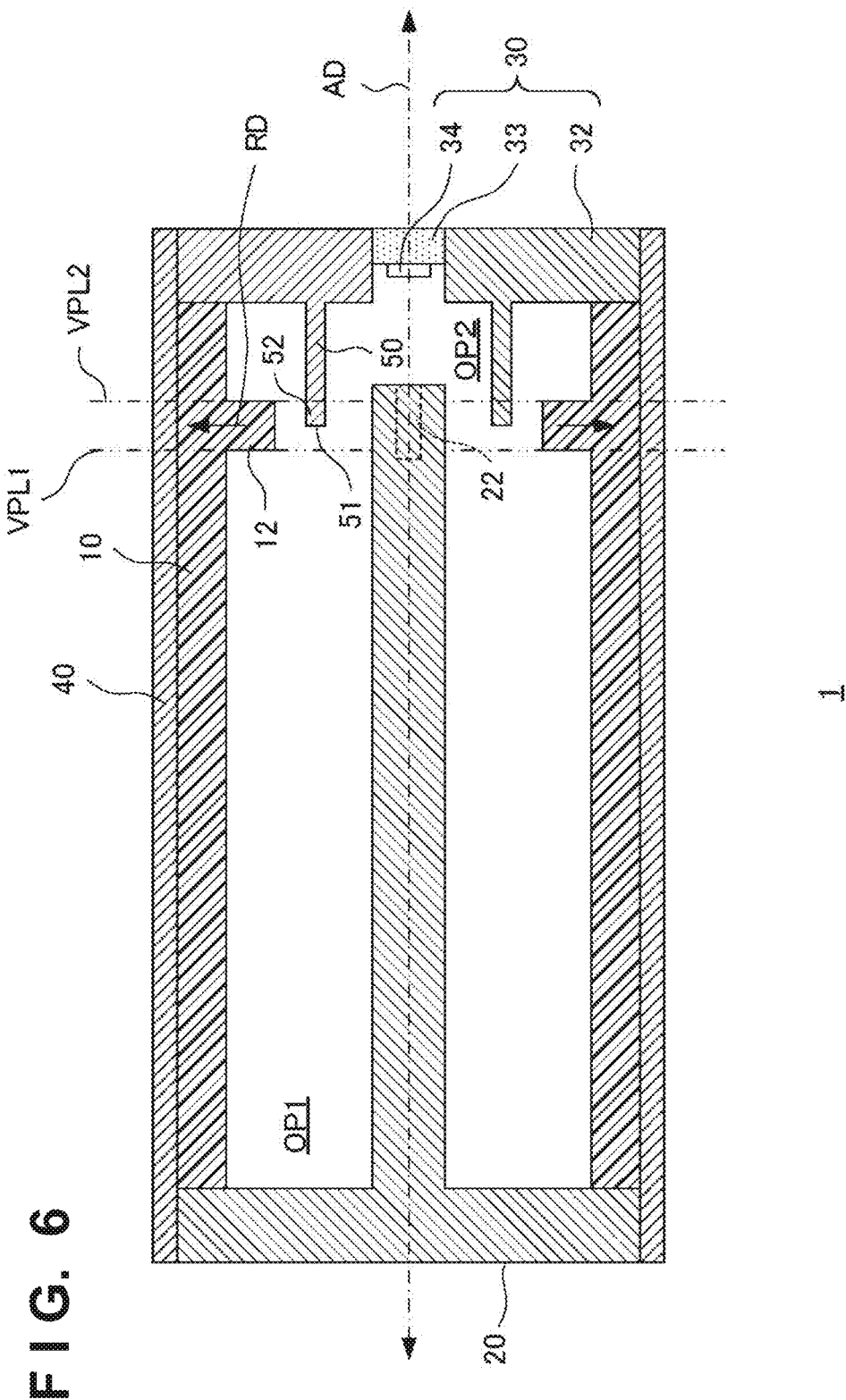
FIG. 6 is a sectional view schematically showing the arrangement of an X-ray generating tube according to the sixth embodiment of the present invention.

FIG. 6 schematically shows the arrangement of an X-ray generating tube 1 according to a sixth embodiment of the present invention. Matters not mentioned in the sixth embodiment can comply with the first to fifth embodiments. In the sixth embodiment, a tubular electrical conductive member 50 is arranged to form a space between the outer surface of the tubular electrical conductive member 50 and the inner surface of an insulating tube 10. This arrangement is applicable to even the X-ray generating tubes 1 according to the first to fifth embodiments.

Figure 7:
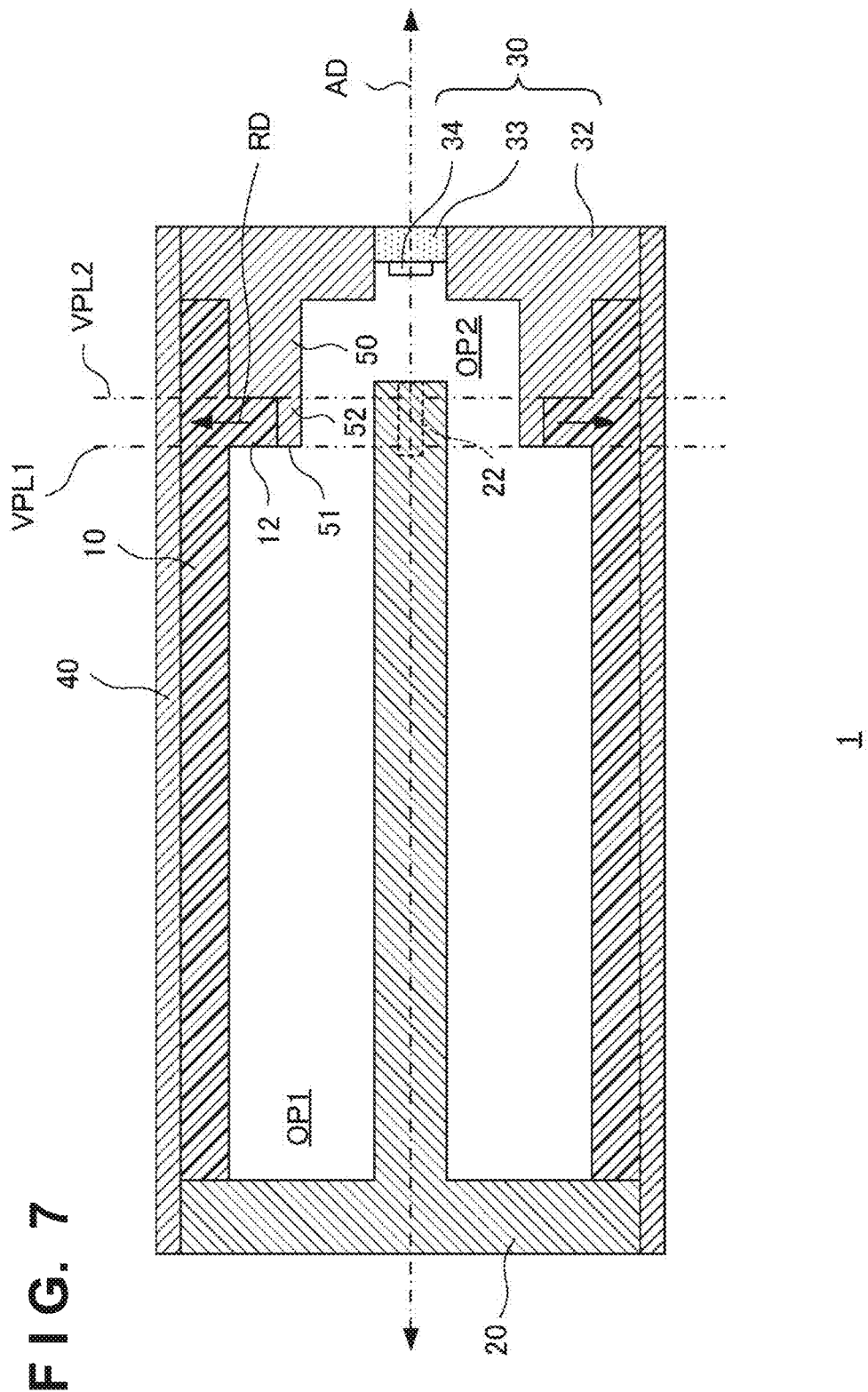
FIG. 7 is a sectional view schematically showing the arrangement of an X-ray generating tube according to the seventh embodiment of the present invention.

FIG. 7 schematically shows the arrangement of an X-ray generating tube 1 according to a seventh embodiment of the present invention. Matters not mentioned in the seventh embodiment can comply with the first to sixth embodiments. In the seventh embodiment, an end face 51 of a tubular electrical conductive member 50 on a cathode 20 side belongs to a first virtual plane VPL1 including an end face of a tubular rib 12 on the cathode 20 side. This arrangement is applicable to even the X-ray generating tubes 1 according to the first and third to fifth embodiments.

Figure 8:
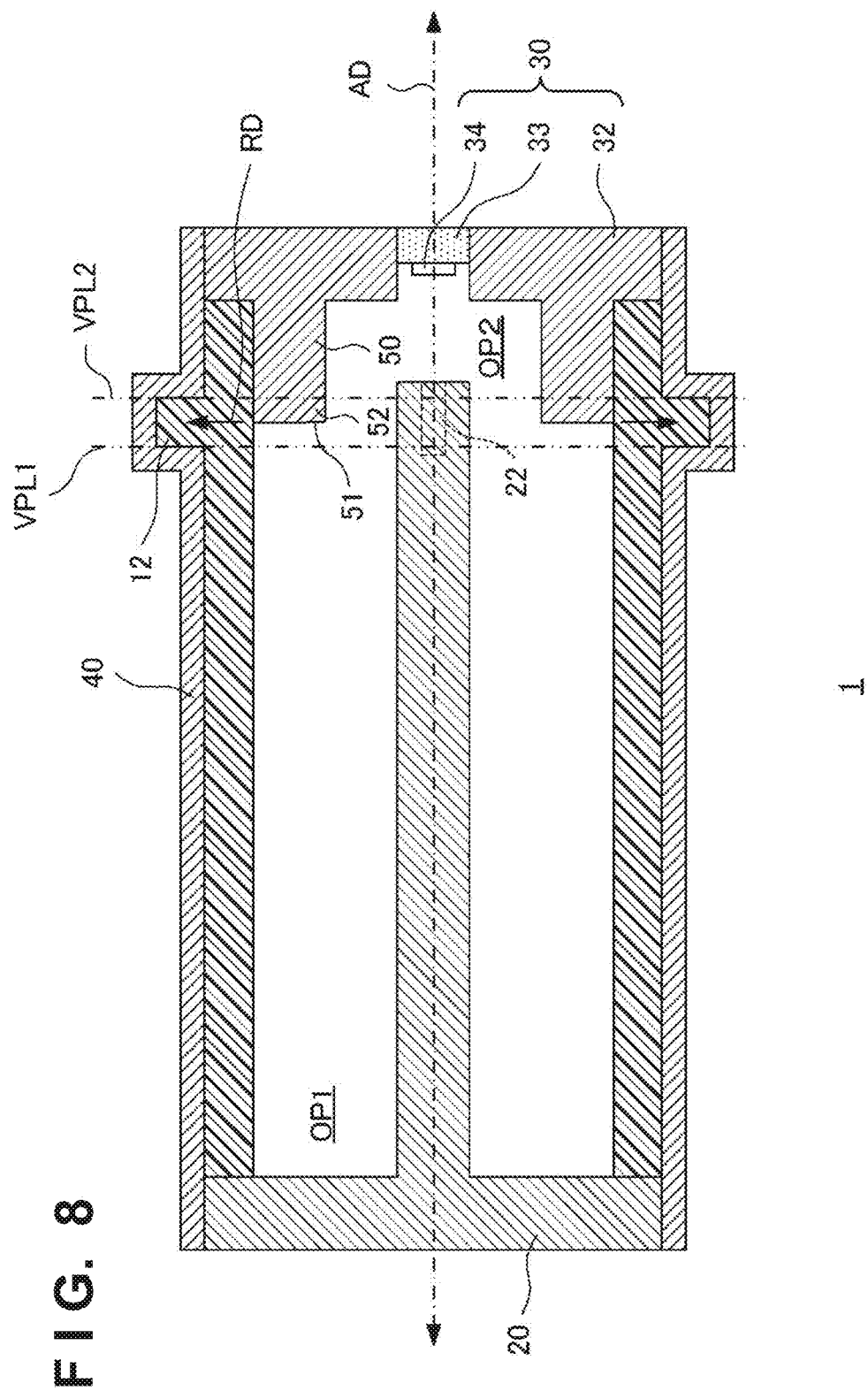
FIG. 8 is a sectional view schematically showing the arrangement of an X-ray generating tube according to the eighth embodiment of the present invention.

FIG. 8 schematically shows the arrangement of an X-ray generating tube 1 according to an eighth embodiment of the present invention. Matters not mentioned in the eighth embodiment can comply with the first to seventh embodiments. In the eighth embodiment, a tubular rib 12 is arranged to project toward the outer space of an insulating tube 10. This arrangement is applicable to even the X-ray generating tubes 1 according to the first and third to seventh embodiments.

Figure 9:
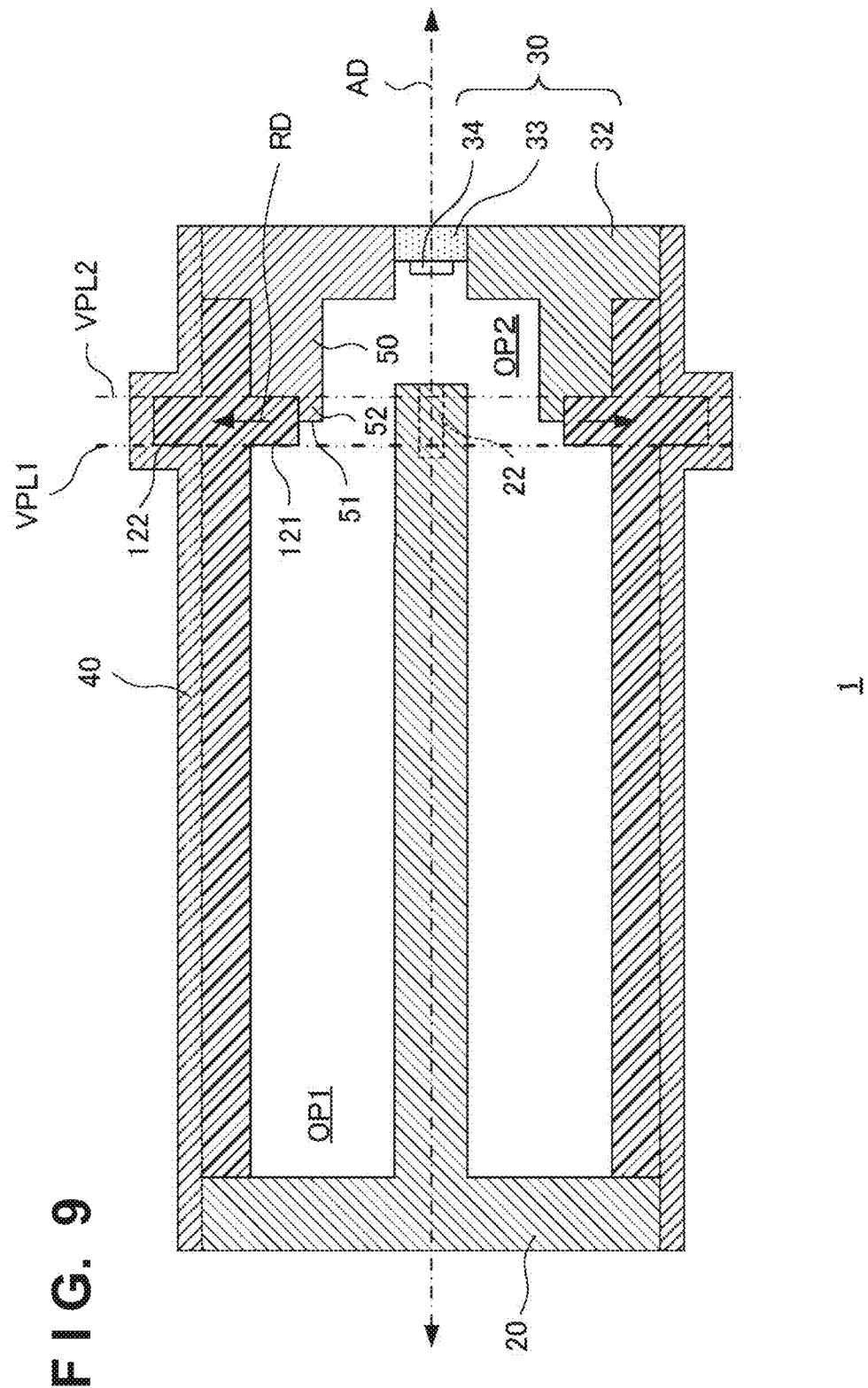
FIG. 9 is a sectional view schematically showing the arrangement of an X-ray generating tube according to the ninth embodiment of the present invention.

FIG. 9 schematically shows the arrangement of an X-ray generating tube 1 according to a ninth embodiment of the present invention. Matters not mentioned in the ninth embodiment can comply with the first to seventh embodiments. In the ninth embodiment, a tubular rib 12 includes an inner tubular rib 121 arranged to face the inner space of an insulating tube 10 and an outer tubular rib 122 arranged to project toward the outer space of the insulating tube 10. This arrangement is applicable to even the X-ray generating tubes 1 according to the first and third to seventh embodiments.

Figure 10:
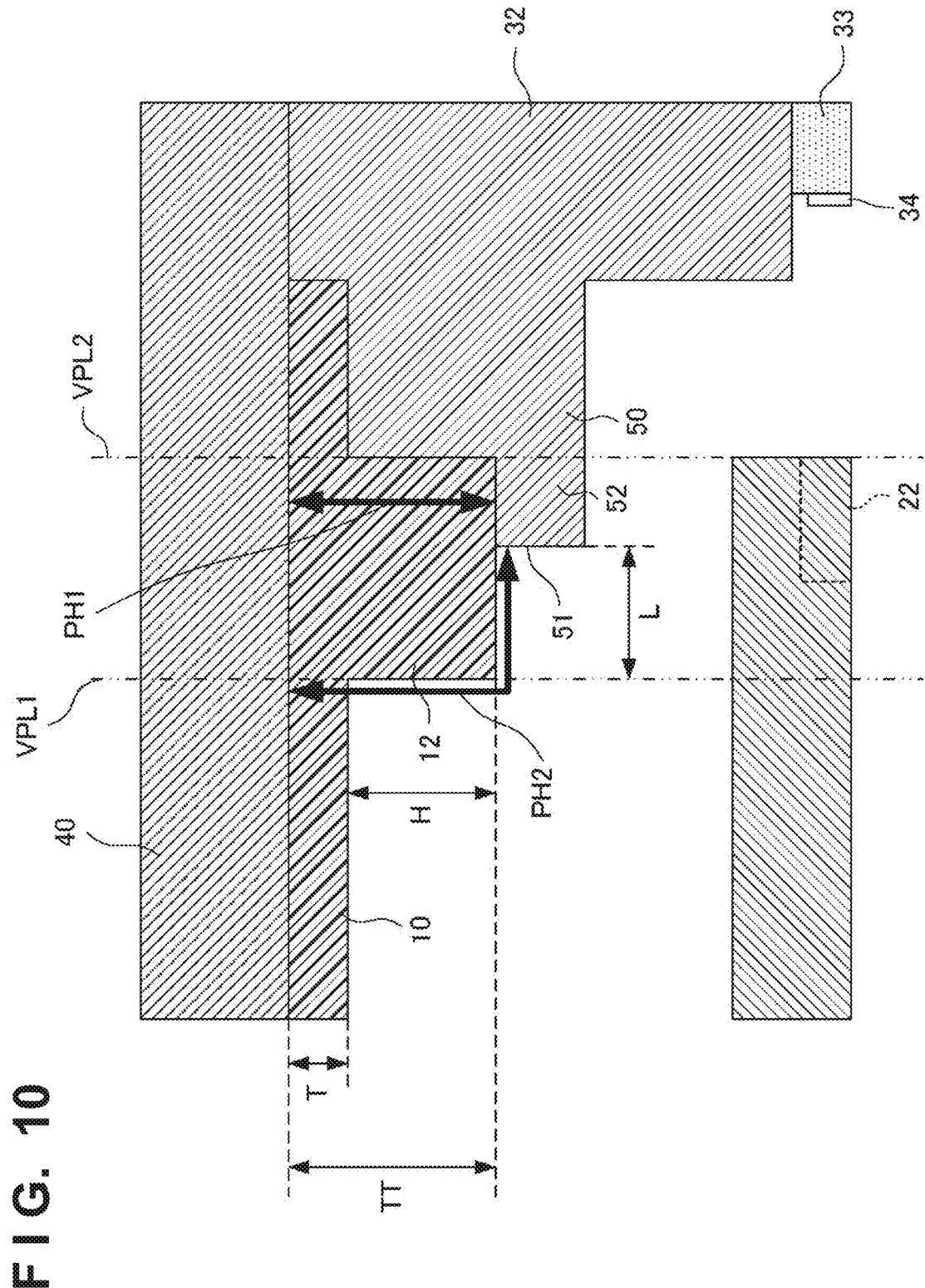
FIG. 10 is a view for exemplarily explaining a design method for a tubular rib and a tubular electrical conductive member.
Figure 11:
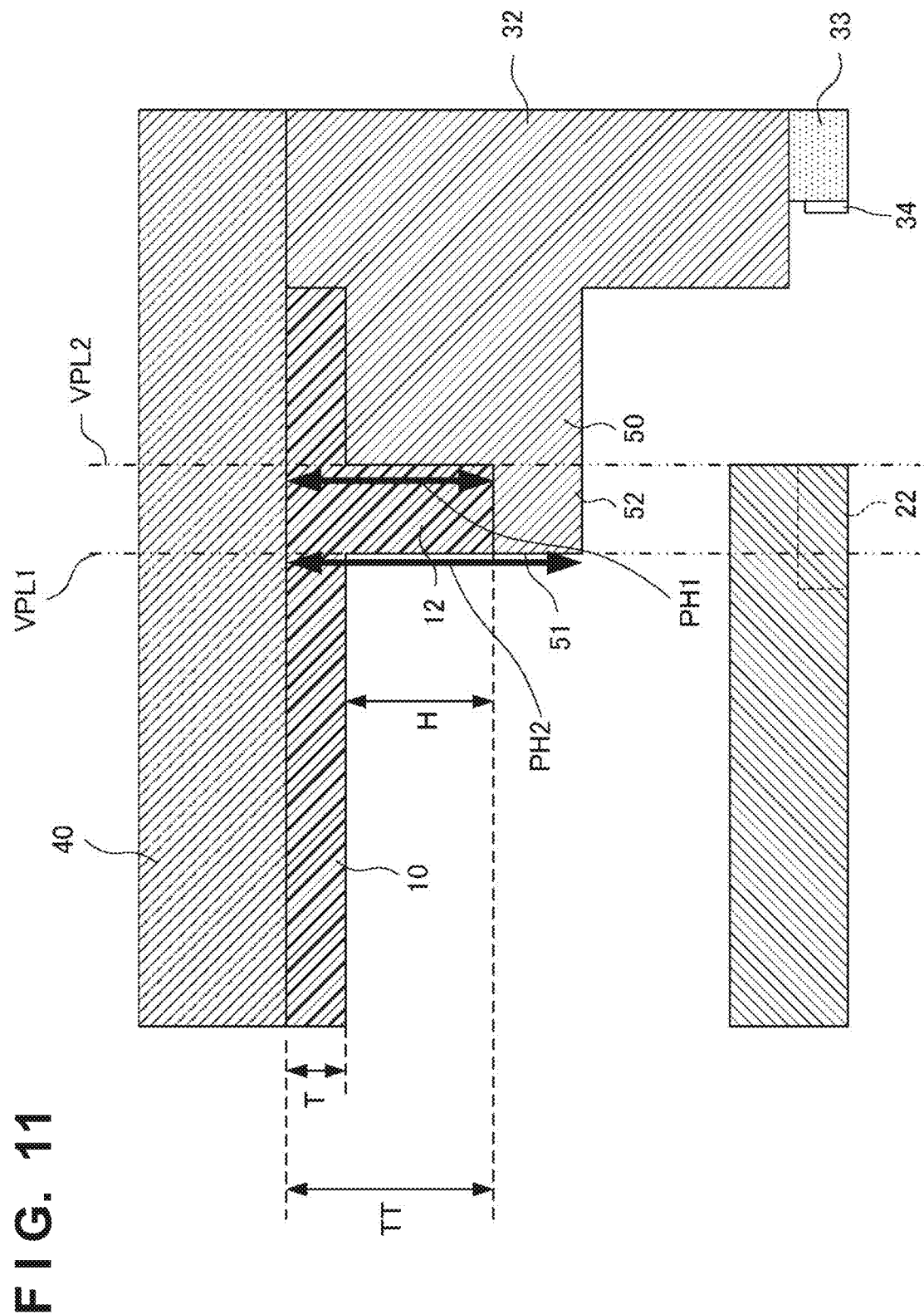
FIG. 11 is a view for exemplarily explaining the design method for the tubular rib and the tubular electrical conductive member.

A design method for the tubular rib 12 and the tubular electrical conductive member 50 will be exemplarily described with reference to FIGS. 10 and 11. T is the thickness of a portion of the insulating tube 10 that does not have the tubular rib 12, H is the thickness of the tubular rib 12, and TT is the thickness of a portion of the insulating tube 10 that has the tubular rib 12. L is the distance between the first virtual plane VPL1 and the end face 51 of the tubular electrical conductive member 50 on the cathode 20 side.

In general, the creepage withstand voltage of an insulator is lower than the bulk withstand voltage, and the creepage withstand voltage is experimentally known to be ⅓ to 1/10 times. E1 (kV/mm) is the bulk withstand voltage of an insulator forming the insulating tube 10, and E2 (kV/mm) is the creepage withstand voltage of the insulator. A withstand voltage (withstand voltage on a path PH1) in the direction of thickness of the portion of the insulating tube 10 that has the tubular rib 12 is E1×TT (kV). In the example of FIG. 10, a withstand voltage (withstand voltage on a path PH2) via the creepage surface of the tubular rib 12 is E2×(L+H)+E1×T. In the example of FIG. 11, the withstand voltage (withstand voltage on the path PH2) via the creepage surface of the tubular rib 12 is E2×H+E1×T. The arrangement in FIG. 10 is superior in the withstand voltage via the creepage surface to the arrangement in FIG. 11.

The arrangement in FIG. 10 will be explained below. To avoid discharge via the creepage surface, E2×(L+H)+E1×T≥E1×TT is preferable. Since TT=T+H, L≥(E1−E2)/E2×H. When the creepage withstand voltage is ⅓ times the bulk withstand voltage (E1=3×E2), L≥2H is preferable. When the creepage withstand voltage is 1/10 times the bulk withstand voltage (E1=10×E2), L≥9H is preferable. When TT is set to be 5 mm in terms of lightening of the X-ray generating tube 1. L≥6 mm is preferable and L≥27 mm is more preferable.

Figure 12:
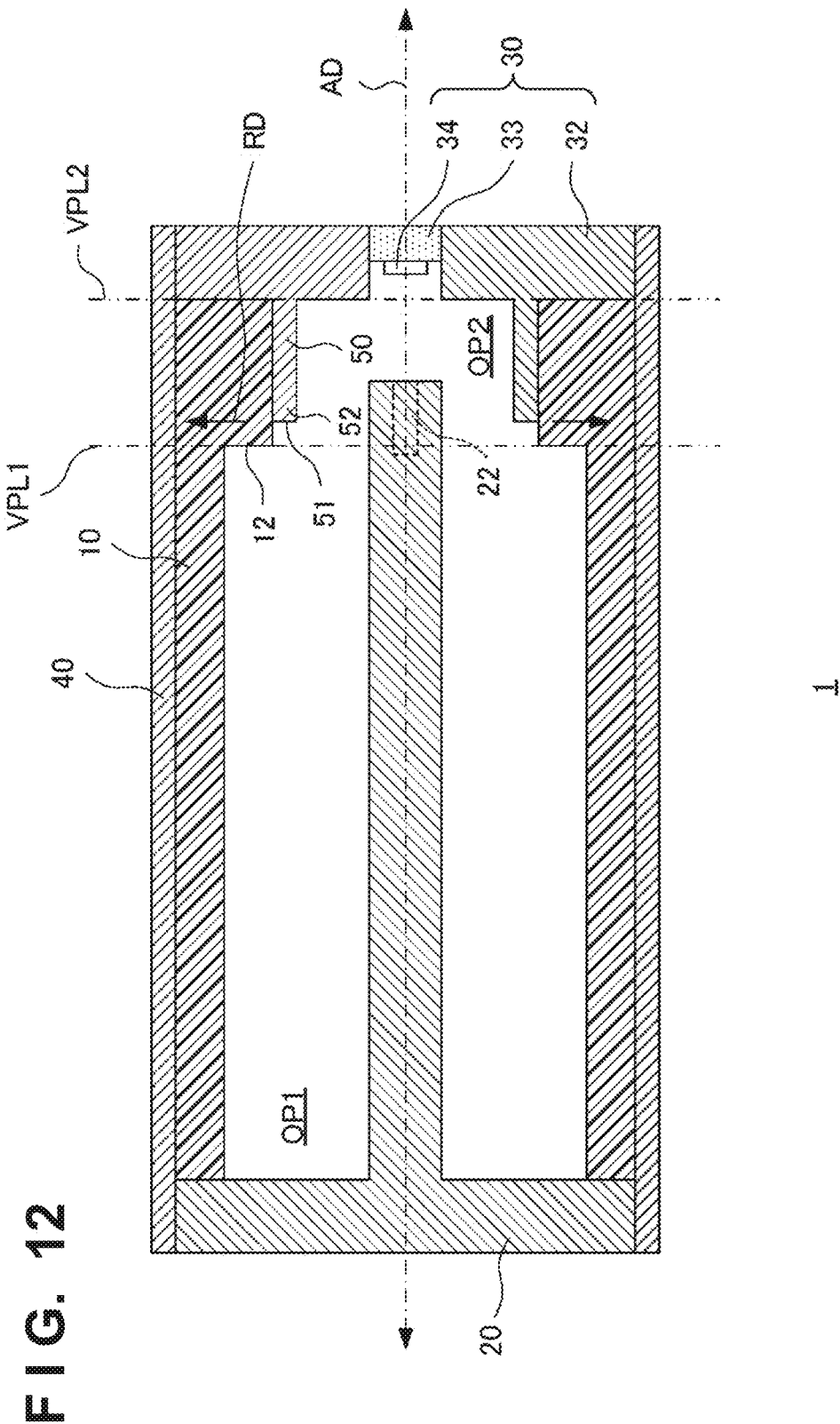
FIG. 12 is a sectional view schematically showing the arrangement of an X-ray generating tube according to the 10th embodiment of the present invention.

FIG. 12 schematically shows the arrangement of an X-ray generating tube 1 according to a 10th embodiment of the present invention. Matters not mentioned in the 10th embodiment can comply with the first to ninth embodiments. In the 10th embodiment, an insulating tube 10 includes a tubular rib 12 arranged in the radial direction when viewed from an end of a tubular electrical conductive member 50 on a cathode 20 side. An end 52 of the tubular electrical conductive member 50 on the cathode 20 side can be positioned between a first virtual plane VPL1 including an end face of the tubular rib 12 on the cathode 20 side and a second virtual plane VPL2 including an end face of the tubular rib 12 on an anode 30 side. The second virtual plane VPL2 can form an end face of the insulating tube 10 on the anode 30 side. In other words, the end face of the tubular rib 12 on the anode 30 side can belong to the same plane as that of the end face of the insulating tube 10 on the anode 30 side. From another viewpoint, the tubular rib 12 can be arranged in contact with the anode 30.

The X-ray generating tube 1 according to the 10th embodiment can include a covering member 40 that is arranged to cover the outside of the insulating tube 10 and receives a potential. The covering member 40 can be arranged to be electrically connected to the cathode 20 and the anode 30. The covering member 40 can cover the cathode 20, the insulating tube 10, and the anode 30 so as to, for example, contact the cathode 20 and the anode 30. The sheet resistance value of the covering member 40 is smaller than that of the insulating tube 10.

Figure 15:
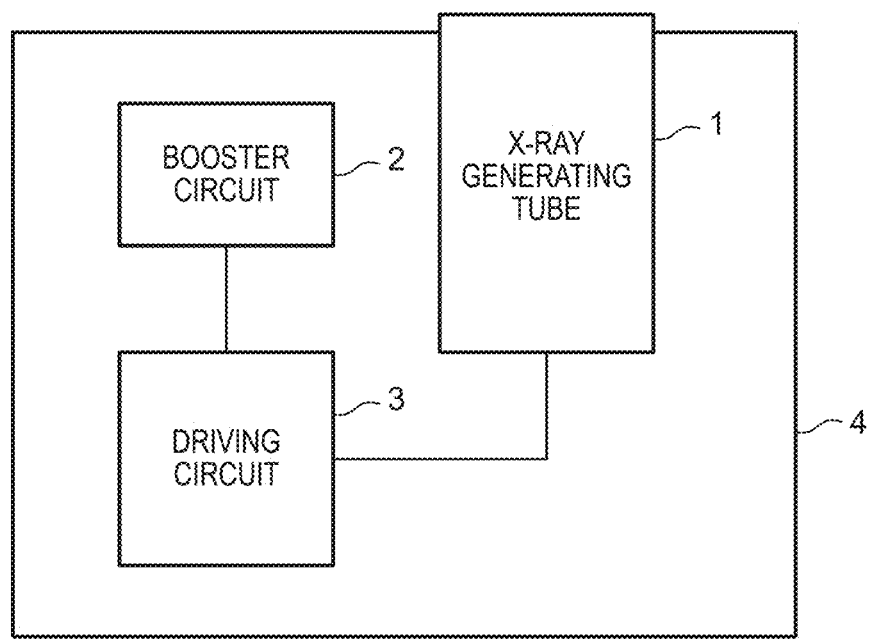
FIG. 15 is a block diagram exemplifying the arrangement of an X-ray generating apparatus according to an embodiment of the present invention.

FIG. 15 shows the arrangement of an X-ray generating apparatus 100 according to an embodiment of the present invention. The X-ray generating apparatus 100 can include an X-ray generating tube 1 and a driving circuit 3 that drives the X-ray generating tube 1. The X-ray generating apparatus 100 can further include a booster circuit 2 that applies a boosted voltage to the driving circuit 3. The X-ray generating apparatus 100 can further include a container 4 that contains the X-ray generating tube 1, the driving circuit 3, and the booster circuit 2. The container 4 can be filled with insulating oil.

Figure 16:
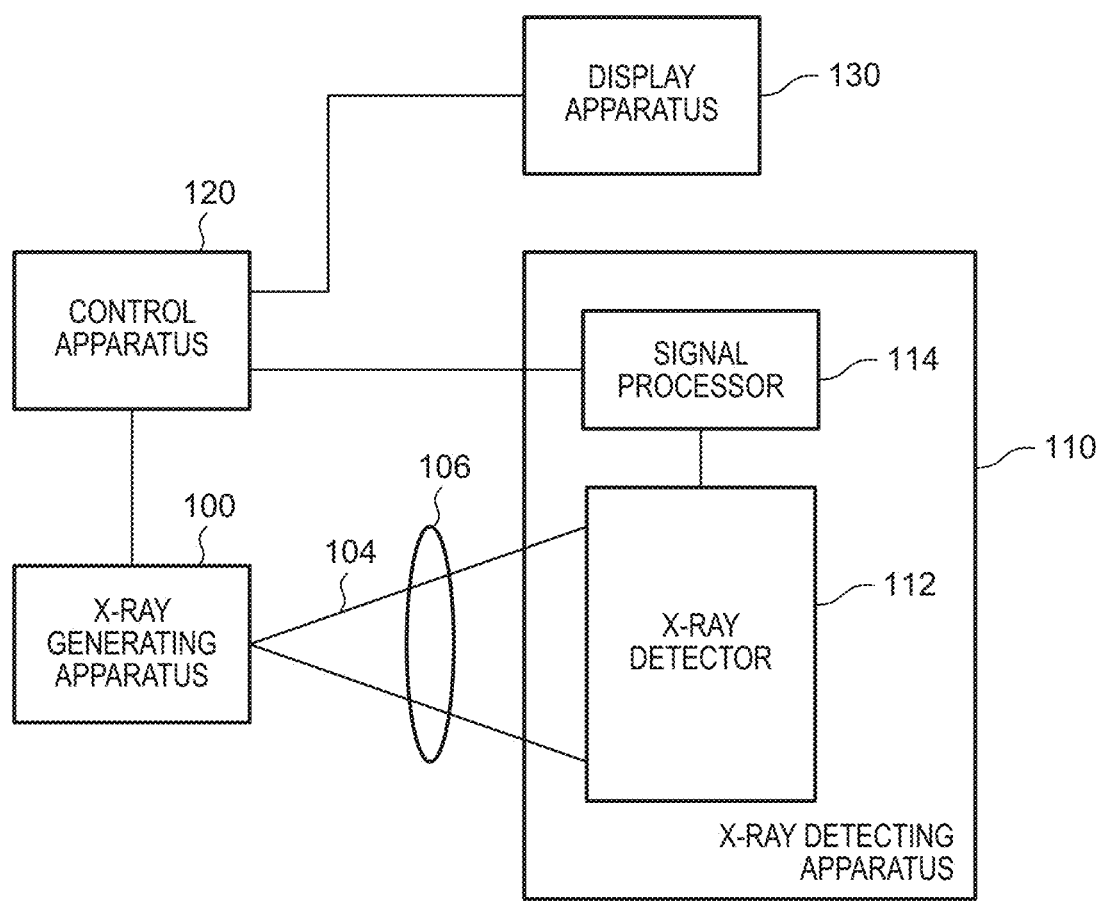
FIG. 16 is a block diagram exemplifying the arrangement of an X-ray detecting apparatus according to an embodiment of the present invention.

FIG. 16 shows the arrangement of an X-ray imaging apparatus 200 according to an embodiment of the present invention. The X-ray imaging apparatus 200 can include an X-ray generating apparatus 100, and an X-ray detecting apparatus 110 that detects an X-ray 104 having passed through an object 106 after radiated from the X-ray generating apparatus 100. The X-ray imaging apparatus 200 may further include a control apparatus 120 and a display apparatus 130. The X-ray detecting apparatus 110 can include an X-ray detector 112 and a signal processor 114. The control apparatus 120 can control the X-ray generating apparatus 100 and the X-ray detecting apparatus 110. The X-ray detector 112 detects or images the X-ray 104 having passed through the object 106 after radiated from the X-ray generating apparatus 100. The signal processor 114 can process a signal output from the X-ray detector 112 and supply the processed signal to the control apparatus 120. The control apparatus 120 causes the display apparatus 130 to display an image based on the signal supplied from the signal processor 114.

The present invention is not limited to the above-described embodiments, and various changes and modifications can be made within the spirit and scope of the present invention.

The invention claimed is:

1. An X-ray generating tube comprising:
   an insulating tube having a first open end and a second open end;
   a cathode including an electron emission source and arranged to close the first open end of the insulating tube;
   an anode including a target that generates an X-ray upon collision with an electron from the electron emission source and arranged to close the second open end of the insulating tube; and
   a tubular electrical conductive member extending from the anode in an inner space of the insulating tube,
   wherein the insulating tube includes a tubular rib extending in a radial direction of the insulating tube at a position spaced apart from the first open end and spaced apart from the second open end, and
   the tubular rib is in alignment in the radial direction of the insulating tube with a distal end of the tubular electrical conductive member such that the tubular rib is in contact with the distal end of the tubular electrical conductive member.

2. The X-ray generating tube according to claim 1, wherein the end of the tubular electrical conductive member on the side of the cathode is positioned between a first virtual plane including an end face of the tubular rib on the side of the cathode and a second virtual plane including an end face of the tubular rib on a side of the anode.

3. The X-ray generating tube according to claim 1, wherein the end face of the tubular electrical conductive member on the side of the cathode belongs to a first virtual plane including an end face of the tubular rib on the side of the cathode.

4. The X-ray generating tube according to claim 1, wherein the tubular electrical conductive member is arranged to define a space between an outer surface of the tubular electrical conductive member and an inner surface of the insulating tube.

5. The X-ray generating tube according to claim 1, wherein the tubular rib is arranged to face the inner space.

6. The X-ray generating tube according to claim 1, wherein the tubular rib is arranged to project toward an outer space of the insulating tube.

7. The X-ray generating tube according to claim 1, wherein the tubular rib includes an inner tubular rib arranged to face the inner space and an outer tubular rib arranged to project toward an outer space of the insulating tube.

8. The X-ray generating tube according to claim 1, wherein the tubular electrical conductive member is arranged to surround an end of the electron emission source on a side of the anode.

9. An X-ray generating apparatus comprising:
the X-ray generating tube defined in claim 1; and
a driving circuit configured to drive the X-ray generating tube.

10. An X-ray imaging apparatus comprising:
the X-ray generating apparatus defined in claim 9; and
an X-ray detecting apparatus configured to detect an X-ray having passed through an object after radiated from the X-ray generating apparatus.

11. An X-ray generating tube comprising:
an insulating tube having a first open end and a second open end;
a cathode including an electron emission source and arranged to close the first open end of the insulating tube;
an anode including a target that generates an X-ray upon collision with an electron from the electron emission source and arranged to close the second open end of the insulating tube; and
a tubular electrical conductive member extending from the anode in an inner space of the insulating tube,
wherein the insulating tube includes a tubular rib at a position spaced apart from the first open end and spaced apart from the second open end, and
the tubular rib is arranged in a radial direction when viewed from an end of the tubular electrical conductive member on a side of the cathode,
further comprising a covering member arranged to cover an outside of the insulating tube and configured to receive a potential,
wherein a sheet resistance value of the covering member is smaller than a sheet resistance value of the insulating tube.

12. The X-ray generating tube according to claim 11, wherein the covering member is electrically connected to the cathode and the anode.

13. An X-ray generating tube comprising:
an insulating tube having a first open end and a second open end;
a cathode including an electron emission source and arranged to dose the first open end of the insulating tube;
an anode including a target that generates an X-ray upon collision with an electron from the electron emission source and arranged to close the second open end of the insulating tube;
a tubular electrical conductive member extending from the anode in an inner space of the insulating tube; and
a covering member arranged to cover an outside of the insulating tube, having a sheet resistance value smaller than a sheet resistance value of the insulating tube, and configured to receive a potential,
wherein the insulating tube includes a tubular rib arranged in a radial direction when viewed from an end of the tubular electrical conductive member on a side of the cathode.

14. The X-ray generating tube according to claim 13, wherein the covering member is electrically connected to the cathode and the anode.

15. The X-ray generating tube according to claim 13, wherein the end of the tubular electrical conductive member on the side of the cathode is positioned between a virtual plane including an end face of the tubular rib on the side of the cathode and a virtual plane including the second open end.

16. The X-ray generating tube according to claim 13, wherein the tubular electrical conductive member is arranged to surround an end of the electron emission source on a side of the anode.

17. An X-ray generating apparatus comprising:
the X-ray generating tube defined in claim 13; and
a driving circuit configured to drive the X-ray generating tube.

18. An X-ray imaging apparatus comprising:
the X-ray generating apparatus defined in claim 17; and
an X-ray detecting apparatus configured to detect an X-ray having passed through an object after radiated from the X-ray generating apparatus.

19. The X-ray generating tube according to claim 13, wherein:
the tubular electrical conductive member extending from the anode has an end between the first open end and the second open end; and
the tubular rib is arranged in the radial direction of the tubular electrical conductive member when viewed from the end of the tubular electrical conductive member on a side of the cathode.

* * * * *